(12) United States Patent
Finarov et al.

(10) Patent No.: US 12,375,026 B2
(45) Date of Patent: Jul. 29, 2025

(54) MOUNT FOR VERTICAL PHOTOVOLTAIC MODULES

(71) Applicant: Sun Terra Ltd., Nataf (IL)

(72) Inventors: Moshe Finarov, Rehovot (IL); Yehoshua Sheinman, Ra'anana (IL)

(73) Assignee: Sun Terra LTD., Nataf (IL)

( * ) Notice: Subject to any disclaimer, the term of this patent is extended or adjusted under 35 U.S.C. 154(b) by 0 days.

(21) Appl. No.: 18/839,066

(22) PCT Filed: Jan. 18, 2023

(86) PCT No.: PCT/IL2023/050050
§ 371 (c)(1),
(2) Date: Aug. 16, 2024

(87) PCT Pub. No.: WO2023/214396
PCT Pub. Date: Nov. 9, 2023

(65) Prior Publication Data
US 2025/0112586 A1    Apr. 3, 2025

(30) Foreign Application Priority Data

May 3, 2022 (IL) .......................................... 292736

(51) Int. Cl.
*H02S 20/30*        (2014.01)
(52) U.S. Cl.
CPC .................... *H02S 20/30* (2014.12)
(58) Field of Classification Search
CPC ........................................ H02S 20/30
See application file for complete search history.

(56) References Cited

U.S. PATENT DOCUMENTS

| | | | | |
|---|---|---|---|---|
| 2010/0077592 | A1* | 4/2010 | Casano | F24S 30/425 29/434 |
| 2015/0207452 | A1* | 7/2015 | Werner | F24S 30/425 136/246 |
| 2018/0155892 | A1* | 6/2018 | Kelleher | E02D 27/50 |
| 2020/0153380 | A1 | 5/2020 | Hilderbrant et al. | |
| 2022/0151163 | A1* | 5/2022 | Agrawal | A01G 9/243 |

FOREIGN PATENT DOCUMENTS

DE        10121437 A1     11/2002

OTHER PUBLICATIONS

International Search Report in PCT/IL2023/050050 dated Mar. 27, 2023.
Written Opinion in PCT/IL2023/050050 dated Mar. 27, 2023.

* cited by examiner

*Primary Examiner* — Jayne L Mershon
(74) *Attorney, Agent, or Firm* — Manelli Selter PLLC; Edward Stemberger

(57) ABSTRACT

A photovoltaic system including a PV module or a number of modules held by a mount consisting of two vertical posts anchored to the ground and two hinges from both sides of the PV module, such hinges providing a pivot for free rotation of the PV module, which is located above the center of mass of the PV module. The rotation of the PV module around the pivot under wind loads significantly reduces the load applied to the mount, thus significantly reducing its manufacturing and installation cost. Using such flapping mount with bifacial PV modules supports the wider use of vertically mounted PV modules.

13 Claims, 8 Drawing Sheets

MOUNT FOR VERTICAL PHOTOVOLTAIC MODULES

TECHNOLOGY FIELD

The present disclosure relates to the mounting of photovoltaic (PV) modules, particularly photovoltaic modules intended for dual use in agriculture and other areas.

BACKGROUND

Photovoltaic (PV) modules or panels are widely used in roof-top and ground solar power installations. Usually, the photovoltaic modules installations are rows of photovoltaic modules or panels either slightly tilted or rotated at an angle to the South with some distance between the rows or fully horizontal photovoltaic modules in dense arrangements. This type of photovoltaic module installation is termed a North-South or N/S mounting or installation. The installation site latitude could require adjustments in photovoltaic panel orientation and the tilt angle. Recently bifacial photovoltaic modules with high bifaciality (>80%) have become available. The additional photovoltaic efficiency gain for these panels, 10% to 20% compared to the monofacial (single side) photovoltaic modules, depends on installation arrangement and the localized albedo.

Bifacial photovoltaic modules support a new type of installation of solar photovoltaic panels, namely vertical photovoltaic mounting (also termed East-West or E/W mounting). In the East-West photovoltaic panels installation, one side of the photovoltaic module collects sunlight before noon, and the other side of the photovoltaic module collects the sunlight afternoon.

U.S. Patent Application Publication No. 2020/0153380 A1 to Heiko Hildebrandt et al. teaches "a photovoltaic system in which a plurality of bifacial photovoltaic modules can be mounted in a vertical arrangement and which satisfies the specific requirements of bifacial photovoltaic modules. In addition, the supporting structure is intended to have sufficient stability in typical weather conditions, particularly against the wind."

In a paper presented at the 35th European Photovoltaic Solar Energy Conference and Exhibition (EU PVSEC 2018), Brussels, September 2018, titled "PERFORMANCE ANALYSIS OF VERTICALLY MOUNTED BIFACIAL PV MODULES ON GREEN ROOF SYSTEM" by Thomas Baumann et al., reported that "according to simulations, vertically mounted bifacial modules can have a higher electrical energy yield than standard bifacial installations depending on the location and the installation conditions."

The vertical photovoltaic panels type of installation with a significant distance between rows (6 m-10 m) of the photovoltaic panels is beneficial for dual use in agriculture because it supports a minimal photovoltaic panel footprint, leaving most of the ground area for agriculture needs between the rows. O. A. Katsikogiannis et al., in a paper titled "Integration of bifacial photovoltaics in agrivoltaic systems: A synergistic design approach", Applied Energy 309 (2022) 118475, analyzed different types of installations of bifacial PV modules. In particular, the authors emphasize that "East-West vertical topologies amplified light penetration, especially during the winter months; accordingly, they are preferable for the cultivation of permanent crops that are grown throughout the year, while South-North facing photovoltaic panels installations are more suitable for summer".

Additional advantages of the vertical photovoltaic modules include smaller shading, which is important for many crop types, e.g., for potatoes, and in parallel low contamination by air particles (as most of the air particles fall vertically on the ground), the vertical photovoltaic modules require less maintenance for cleaning.

A significant drawback of the existing vertical mounts is the high wind resistance. In the case of winds directed towards the PV modules, all the wind load is applied to the vertical mount (mainly to the posts and crossbeams), which holds the PV modules. To withstand the wind load by the mount, which should be designed to the maximum possible wind load in the installation site area, the mount construction and its anchoring to the ground should be sufficiently stiff. The stiffness requirement adds a significant additional cost to the mount that might limit the proliferation of such vertical PV installations or significantly reduce their economic profitability.

Worth to emphasize that there is a significant market segment of PV tracking systems in which different types of electro-mechanical drivers control the angular position of the PV panel. In such PV panel tracking systems, a built-in anemometer sensor communicating with a driver controller reduces the resistance to strong winds by locating the PV panel plane in a horizontal position. Such tracking systems are more expensive than vertically mounted PV systems and require significant maintenance caused by moving parts and higher panel contamination. Such PV tracking systems are less suitable for dual-use applications like solar rows along roads and railways. The current disclosure presents an alternative solution to tracking systems. The alternative solution combines low cost and low resistance to strong winds.

The wind load on the tilted plane may be calculated according to the approach described in a paper titled: "THE FLIGHT OF WIND BORNE DEBRIS: AN EXPERIMENTAL, ANALYTICAL, AND NUMERICAL INVESTIGATION—PART III: CFD SIMULATIONS by Bruce Kakimpa et al. presented at The Seventh Asia-Pacific Conference on Wind Engineering, Nov. 8-12, 2009, Taipei, Taiwan.

Definitions

As the current disclosure, "bifaciality" defines the photovoltaic panel rear side efficiency ratio to the front side efficiency, measured under standard test conditions.

As used in the current disclosure, the tilt angle of the PV module is 0° when the photovoltaic module's plane is in the vertical plane, perpendicular to the ground.

The current disclosure uses the term horizontal plane, which means a virtual plane parallel to the ground; The tilt angle of the PV module plane in the vertical plane is ±90°, depending on the tilting direction.

As used in the current disclosure, a pivot is a rotation axis parallel to the ground and supporting PV module rotation relative to the vertical plane.

The term aerodynamic or flapping mount means a photovoltaic module mount supporting rotation of the photovoltaic module around a pivot under a wind load.

In the current disclosure, "about" means a deviation of +/−10% of the parameter from the original value.

SUMMARY

The present disclosure describes an aerodynamic photovoltaic vertically mounted system, including two vertical posts anchored to the ground for holding at least one vertical photovoltaic module at both sides, supporting the PV module's free rotation under a wind load. The wind load tilts the photovoltaic module around the pair of hinges into a position with reduced resistance to the wind load and reduces the drag force acting on the posts.

LISTING OF DRAWINGS AND THEIR BRIEF DESCRIPTION

A reference is made to the accompanying drawings to better understand examples of the method and apparatus and illustrate how it could be carried into effect.

Figure 1A:
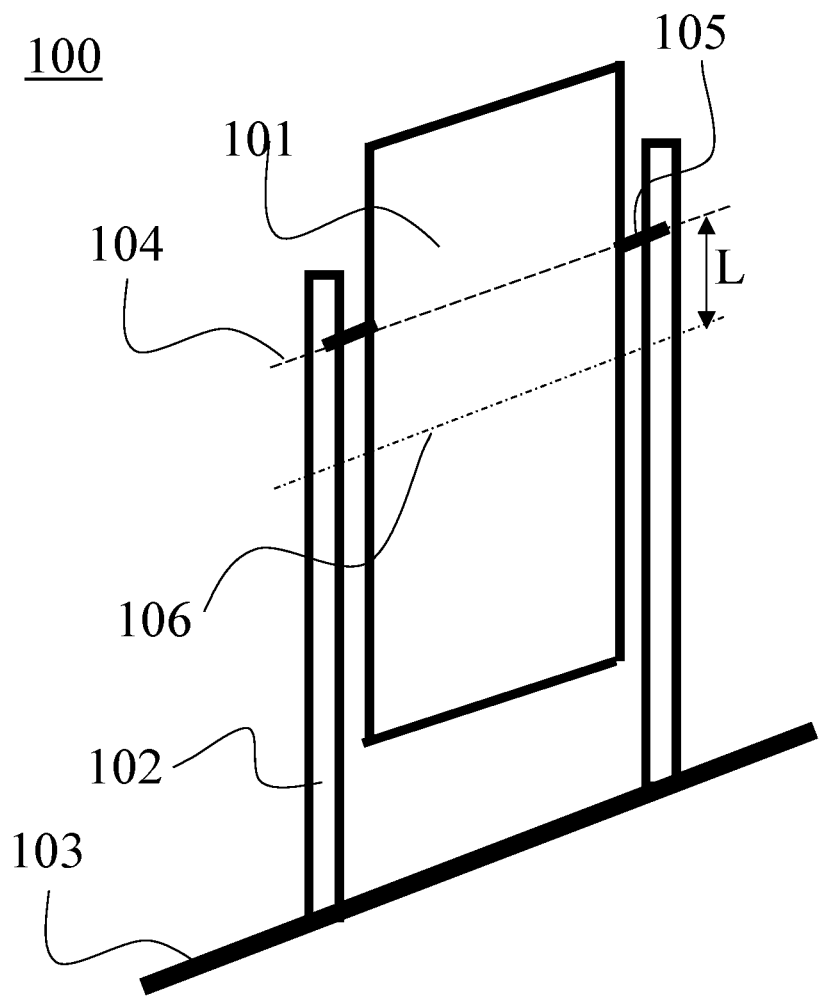
FIG. 1A is a schematic view of an example of a vertical photovoltaic module mount.
Figure 1B:
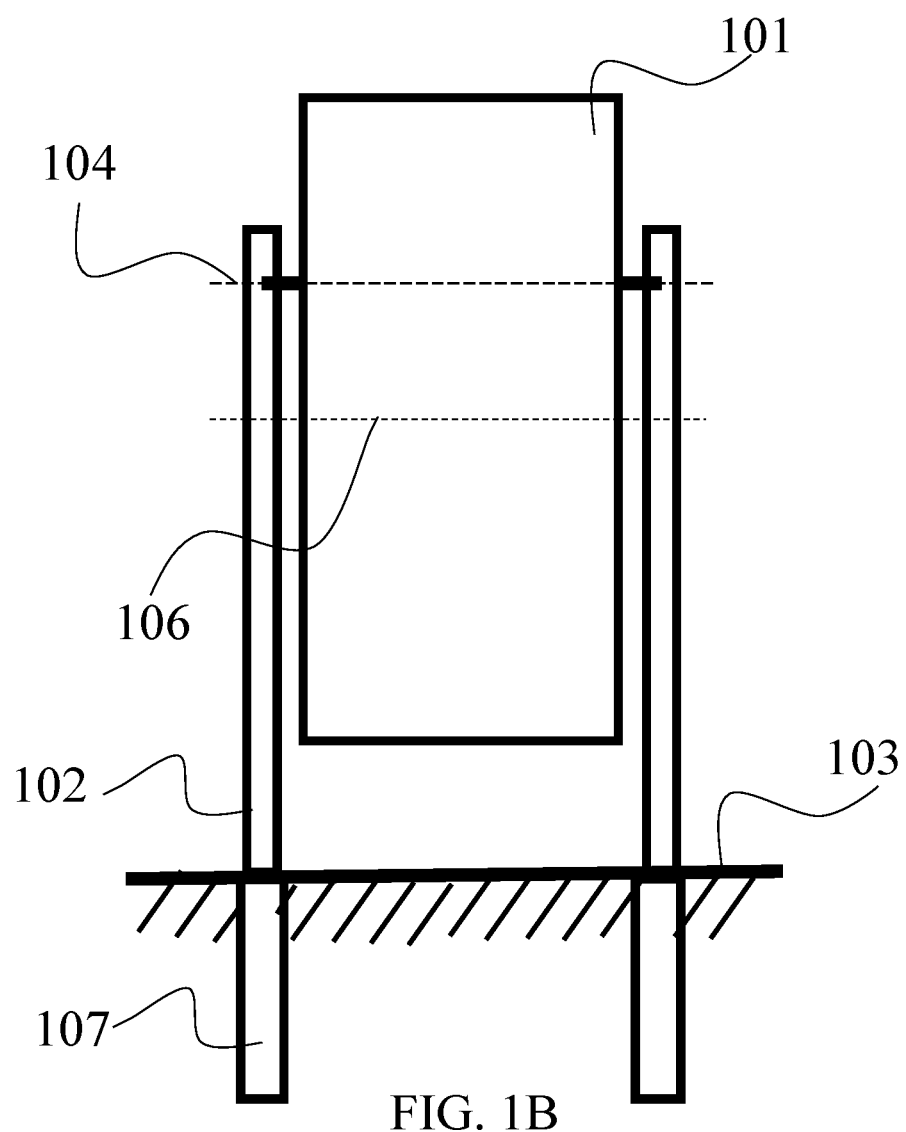
FIG. 1B is a front view of the vertical photovoltaic module of FIG. 1A anchored in the ground.
Figure 1C:
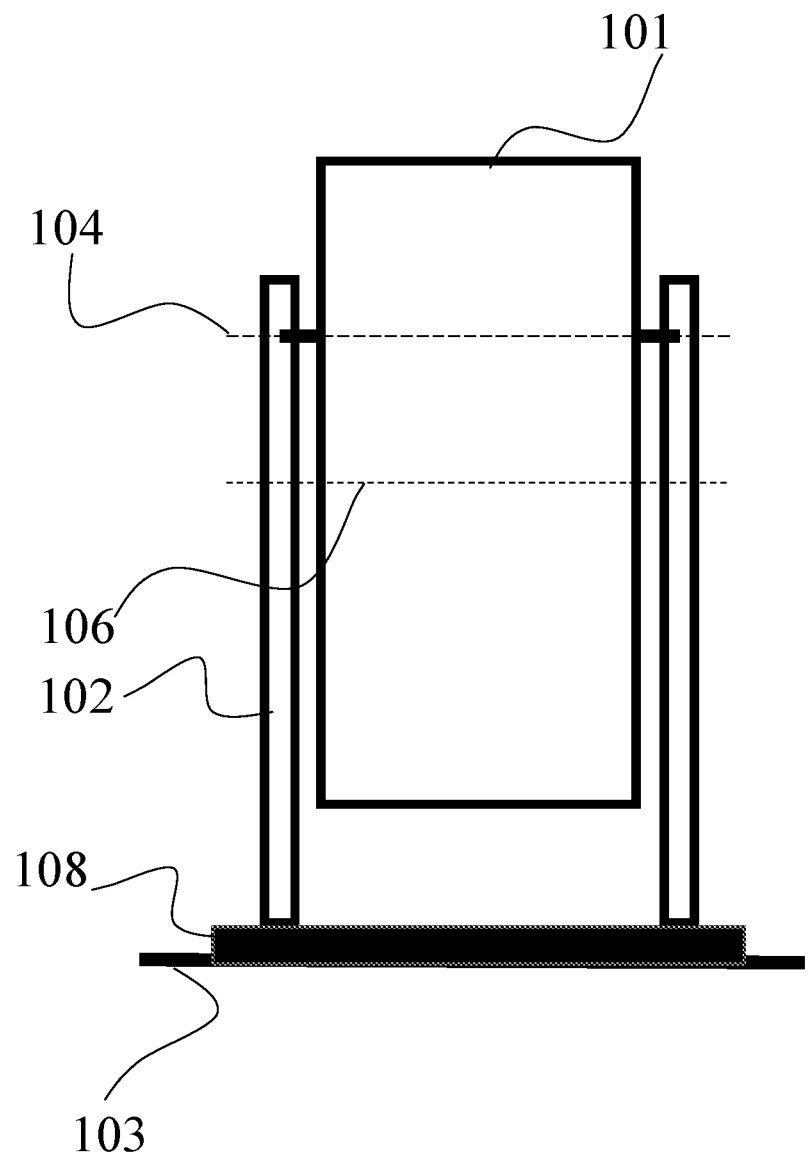
Figure 2:
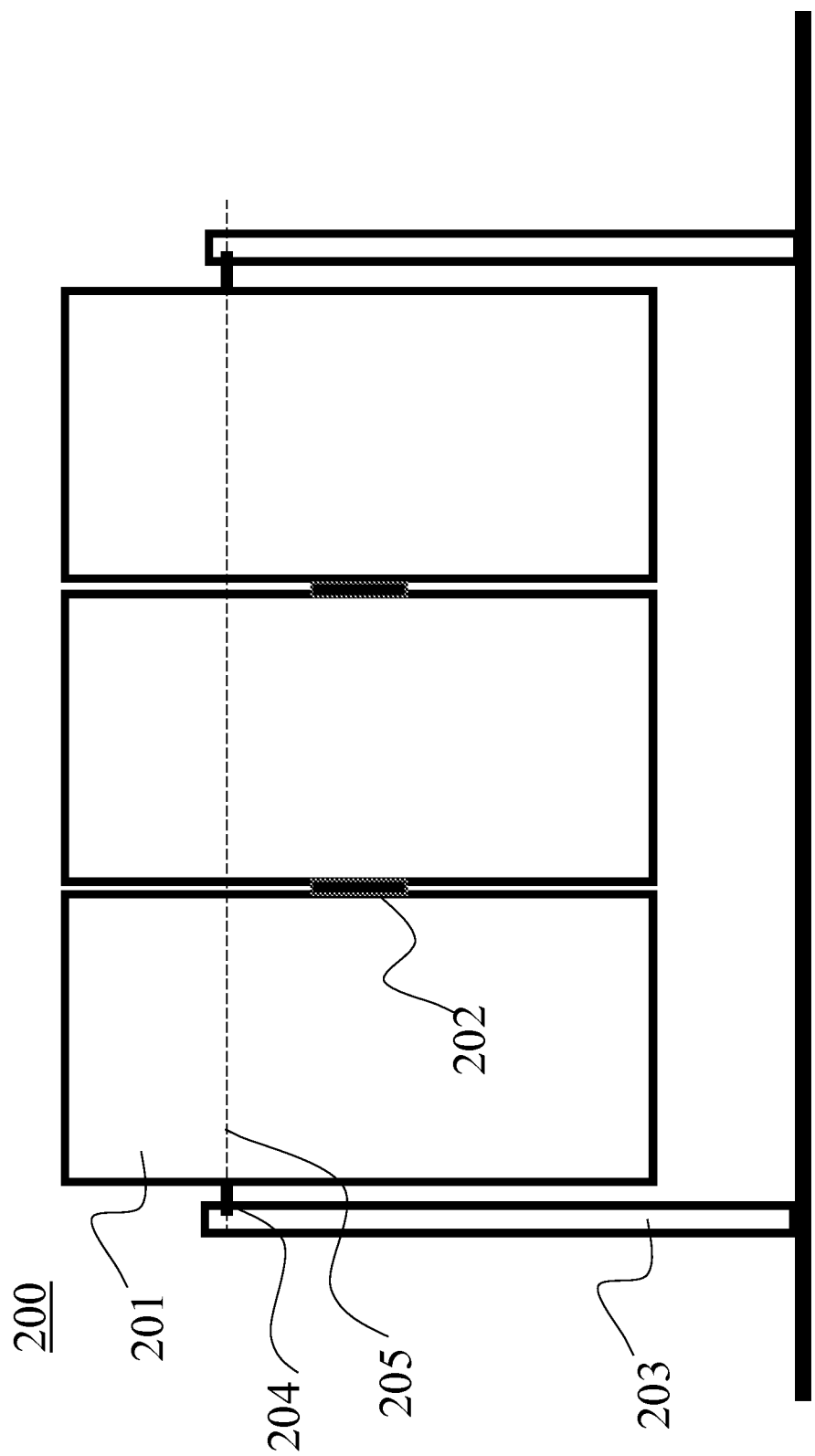
Figure 3B:
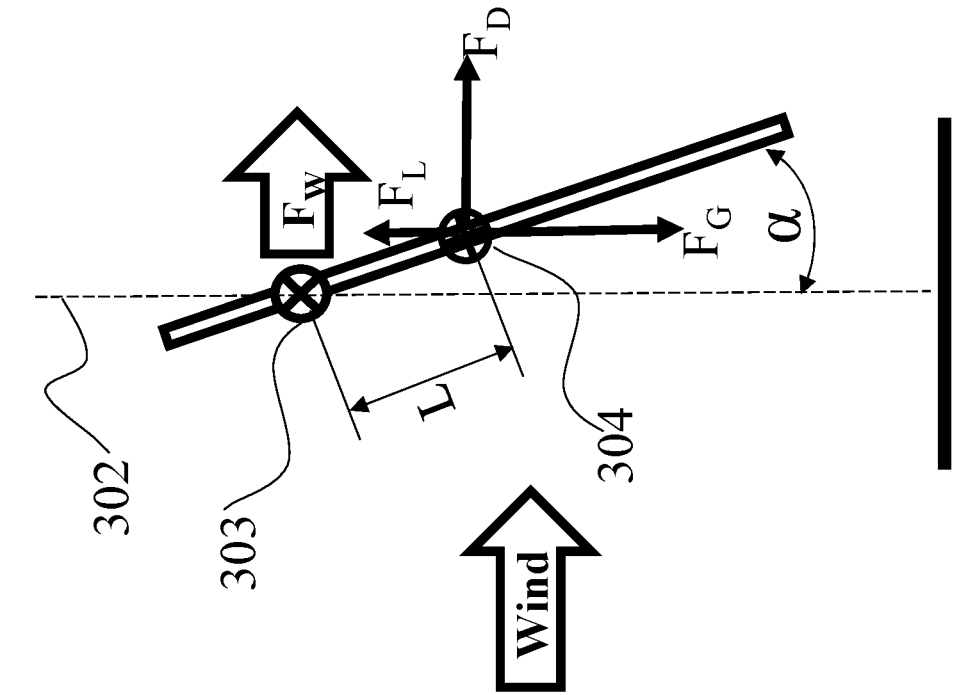
Figure 3A:
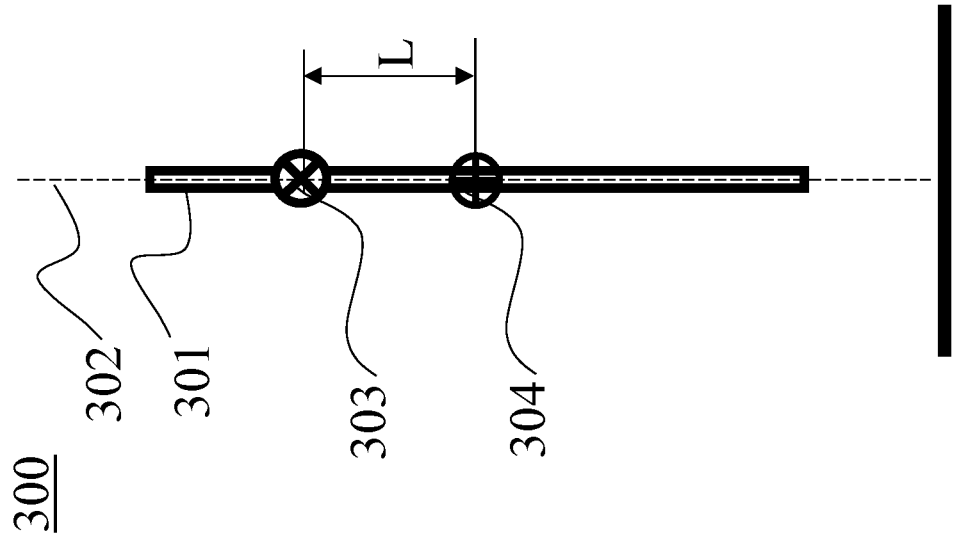
Figure 4:
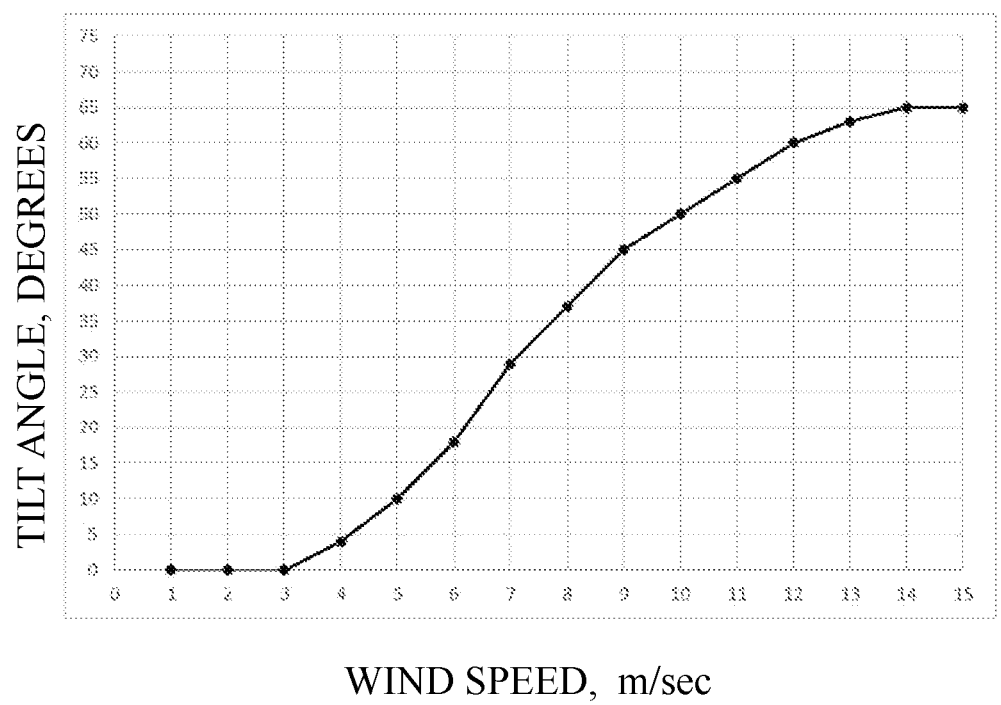
Figure 5:
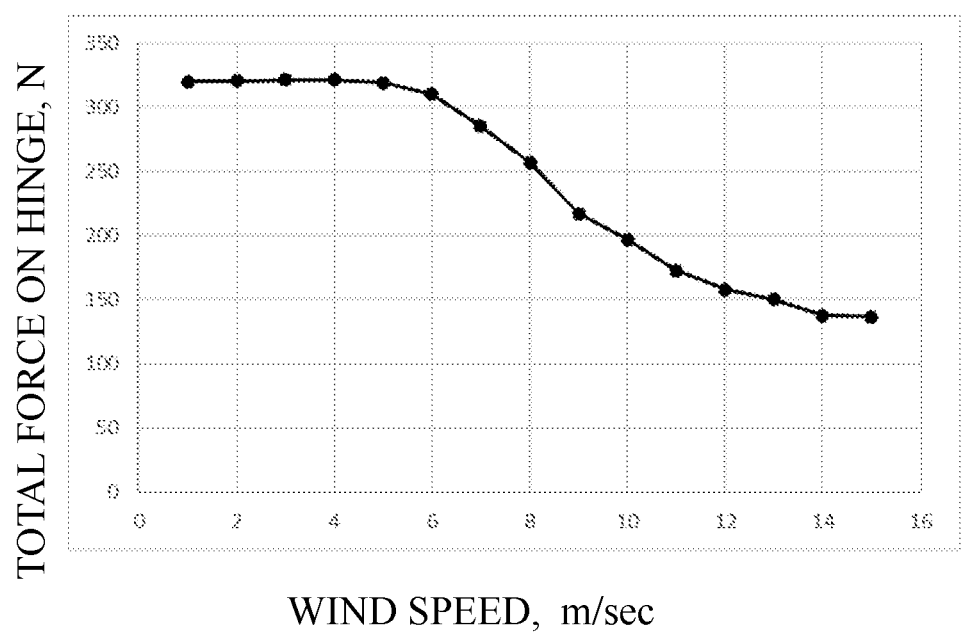
Figure 6:
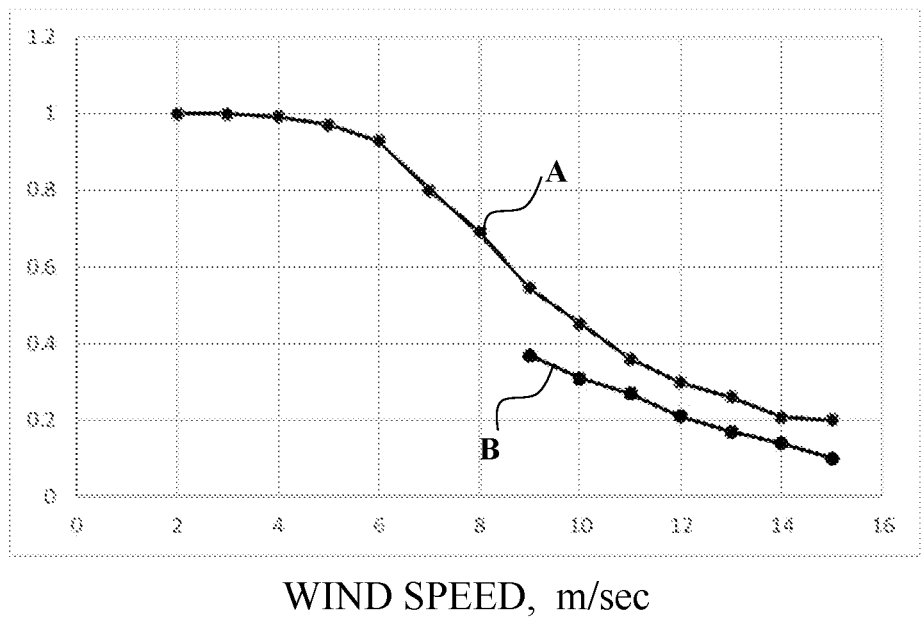

FIG. 1C—is a front view of the vertical photovoltaic module of FIG. 1A anchored to a concrete pedestal;

FIG. 2 is a schematic view of a photovoltaic system according to the current disclosure, including three PV modules supported by two vertical posts;

FIG. 3A is a schematic presentation of the photovoltaic module position in the absence of a wind load;

FIG. 3B is a schematic illustration of the PV module position under a wind load, directed toward the PV module plane, and the forces applied to the PV module;

FIG. 4 shows PV module tilt angle at different wind speeds for an exemplary PV mount and module;

FIG. 5 is a graph illustrating a total force on the hinge at different wind speeds for an exemplary PV mount and module; and FIG. 6 is a graph illustrating a hinge force ratio between the present and static PV systems mounts at different wind speeds.

For simplicity and clarity of explanation, elements shown in the figures have not necessarily been drawn to scale. For example, the dimensions of some of the elements may be exaggerated relative to other elements.

DESCRIPTION

The conventional horizontal photovoltaic panel installation is usually tilted towards the South. The photovoltaic panel mount occupies a relatively large (ground surface) footprint. The vertical bifacial photovoltaic module mount installations generate similar electric power and occupy a significantly smaller footprint. The ground surface available for conventional photovoltaic modules horizontally mounted installations is limited. A dual-use vertical photovoltaic panel helps to overcome this limitation.

The dual-use photovoltaic applications are mainly useful for agriculture and solar fences around infrastructure installations, roads, and railways. In all these applications, the vertical photovoltaic module or panel mount, characterized by a minimal possible footprint, easy maintenance, and relatively low cost, provides significant advantages relative to other types of photovoltaic module mounts.

Vertical PV mount requires high stiffness to withstand the wind load. Such high stiffness is usually reached by using massive posts and crossbeams holding the PV modules and inserting such posts deeply (2 m-3 m) into the ground. Such massive construction leads to a high cost for the mount. The high cost limits the proliferation of vertically mounted PV mounts in dual-use PV applications.

Therefore, a technical challenge is providing a cost-effective mount for vertical PV modules supporting proper wind load resistance. The current disclosure describes a solution for the vertically mounted PV modules. The disclosed photovoltaic module mount significantly reduces the required mount stiffness and, consequently, the mounting cost.

The presented solution, termed as an aerodynamic or a flapping mount, facilitates free rotation of the PV module around the pivot located above the center of mass of the PV module. The wind directed towards the PV module plane lifts or tilts the PV module and rotates it around the pivot. Therefore, the wind load acts against the PV module weight: the higher the wind speed, the greater the tilt angle of the PV module plane relative to the vertical plane. The PV module will be positioned close to the horizontal plane in the extreme case of very high wind speed. Therefore, the drag force on the posts holding the PV module with the help of hinges or bearings is always reduced. Since the pivot is located above the center of mass of the PV module after the wind drops, the gravitation force returns the PV module to the original vertical position.

The following description presents various aspects of the present solution. For the purpose of explanation, specific configurations and details are set forth in order to provide a thorough understanding of the present disclosure. However, it will also be apparent to one skilled in the art that the present system and method could be practiced without the specific details presented herein. Not to obscure the present disclosure, some known features have been omitted or simplified.

The disclosure supports the use of vertical photovoltaic modules in different dual-use applications: Agri-PV, fences around settlements, water reservoirs, fences along roads and railways, and fences around large conventional horizontal PV installations.

FIG. 1A is a schematic view of an example of a vertical photovoltaic module mount 100. For the simplicity of the explanation, the assembly of photovoltaic elements forming the photovoltaic module are not shown. Two vertical posts 102 support PV module 101 from both sides of the module (panel). Posts 102 are anchored to the ground 103. The PV module 101 has freedom of rotation around pivot 104. A pair of hinges 105 connect the PV module 101 to vertical posts 102 and could be friction hinges or ball bearings. The pivot 104 is coaxial and coincides with the axes of hinges 105, that is parallel to the ground. Pivot 104 is located above the horizontal line 106, crossing the center of PV module mass at a distance L. In FIG. 1B, posts 102 are mounted inside the ground with the help of insertions 107. The depth of the insertions depends, on the one hand, on the expected load forces (under a wind load) and, on the other hand, on the ground structure (earth, sand, stone, rock, etc.) and could be in a range of 0.5 m to 3 m. FIG. 1C is an example of vertical posts 102 connected to a concrete pedestal 108, which provides the required stiffness and stability to the whole mount. Such pedestals, having inserted screws to connect the post undercarriages (not shown), may simplify and accelerate the installation of the vertical PV system. Other ways of anchoring the posts 102 to the ground are also possible.

The PV system presented in FIG. 1 is one of the possible configurations. Other possible configurations, which may differ in the amount of PV modules between the posts and the PV module orientation, like portrait and landscape, could be used. According to the current disclosure, FIG. 2 is a schematic view of a photovoltaic system, including three PV modules supported by two vertical posts. Three PV modules 201 are connected between them, e.g., by screws or slats 202. The three modules 201 are connected to two posts 203 by hinges 204, facilitating their joint free rotation around a pivot 205.

FIG. 3A is a schematic illustration of a side view of the PV mount 300 in the absence of wind. The posts were removed for clarity. FIG. 3A schematically shows a side view PV module 300, located in a vertical plane 302. PV module 300 has freedom of rotation around pivot 303. Pivot 303 is located above the center of mass 304 at a distance L. FIG. 3A shows a nominal position of a vertically mounted PV module in the absence of winds directed towards the PV module perpendicularly to the PV module plane.

FIG. 3B is a schematic illustration of the PV module under a wind load directed toward the PV plane. Wind load causes two types of aerodynamic forces applied to the PV module 301: a Drag force FD and a Lift force $F_L$, which create a momentum force, rotating the PV module around the pivot 303. At the same time, a Gravitation force $F_G$, schematically applied to the center of mass 304, creates a momentum force in the opposite direction. At each wind speed value, there is a tilt angle α, at which both forces ($F_G$ and $F_L$) are balanced. Unlike a prior art static vertical mount, in which all the wind load is applied to the posts, in the current solution, most of the wind load acts against the PV module weight forcing the rotation of the PV module, so the load on the posts is significantly reduced.

The simplified calculations of the aerodynamic forces and tilt angles at different wind speeds are made on a base of a theoretical simulation approach presented in the paper of Bruce Kakimpa et. al, mentioned above. The calculations are made, for example, for a bifacial PV module JAM72D30 525-550/MB manufactured by JA Solar (Beijing, China), having dimensions of 2255 mm×1134 mm and a weight of 31.6 kg. The distance L is assumed, for example, to be 0.5 m and may be optimized per specific design of the PV module and of the mount. All the calculations are carried out for a quasi-stationary PV module state, assuming that the wind velocity is constant.

FIG. 4 shows PV module tilt angle at different wind speeds. The calculated PV panel tilt angles at different wind speeds in a range of 0 to 15 m/sec, which are typical for most of country territory at relatively low heights of the mount (<3 m). At zero wind speed, the PV module is vertical (α=0, FIG. 3), and the lateral load on the PV mount is zero. At low wind speeds (<5 m/sec), which is typical for most of the time in many geographic regions, the PV panel tilt is relatively small (<10°). Accounting that in an actual PV mount, there is always certain friction in the bearings; at such low wind speeds, the PV module practically remains close to vertical. At wind speeds in the range of 5 to 8 m/sec, which is typical for some periods of time, mainly in shapes of "long gusts", i.e., lasting period of above 10 seconds, the wind may rotate the PV module to an angle of about 400 from the vertical while at a very high wind speed of about 15 m/sec (in case of storm) the tilt angle α may reach 65°. Practically, the PV module cannot reach the horizontal plane (α=90°) as the lifting forces (the product of the lift and drag forces) are too small to balance the module weight.

FIG. 5 shows a calculated load force on the hinges for the same example of the PV module. The closer the PV module is to the horizontal plane (α=90°), the lower the load on the hinges. It is important to mention that the maximum load on the mount is about 320 N (about 32 kg), which does not grow with wind speed increase.

FIG. 6 is a graph illustrating a hinge force ratio between the present flapping (aerodynamic) and static PV systems mounts at different wind speeds. The force is applied to the hinges of two types of vertical PV mounts: the aerodynamic mount and the static mount (the PV panel is stationary). Curve A shows a full force acting on the hinges of the PV mount, and curve B shows the lateral force $F_W$, parallel to the ground, as shown in FIG. 3B. Lateral force is important for designing the posts anchoring to the ground because it creates a significant torque (having a large arm of about 2 m in the present example). FIG. 6 shows that in the case of flapping mount as in the disclosed solution, compared to the static PV mount, it is possible to use low-mass posts, and the insertion of the posts into the ground (i.e., the ground reaction to an external torque) can also be much shorter. Although the theoretical calculation used is a simplified approximation of the actual situation at the installation site, it indicates a clear difference in the needed stiffness in this aerodynamic solution relative to the static mount.

Practical implementation of the disclosed solution is simple and has a lower cost. The posts are less robust and could be made of standard steel or aluminum profiles manufactured in mass production by roll-forming, sheet metal bending, or extrusion. The vertical posts supporting the PV module could be inserted into the ground to a shallower depth of less than 3.0 meter. The hinges may be low-cost bearings, e.g., pillow block bearings of KP series being distributed by AliExpress web store. Additionally, the advantage of such bearings is a large tolerance to axial misalignment, which makes installing the PV system easier, and in a real site with non-ideal topography.

While the apparatus and method have been described with respect to a limited number of examples, these should not be construed as limitations on the scope of the apparatus and method. Other possible variations, modifications, and applications are also within the scope of the disclosure. Accordingly, the scope of the disclosure should not be limited by what has been described but by the appended claims and their legal equivalents.

What is claimed is:

1. A method of reducing the wind load resistance of a vertically mounted bifacial photovoltaic module, comprising:
    providing two vertical posts anchored to ground for supporting at least one photovoltaic module on both sides of the at least one photovoltaic module,
    providing the at least one photovoltaic module with a pair of hinges, with a hinge on each side thereof connecting the photovoltaic module to the vertical posts, facilitating a free rotation of the at least one photovoltaic module;
    locating a pivot coaxial with an axis provided by the hinges above the center of mass of the at least one photovoltaic module; and
    wherein when a wind load acts on the at least one photovoltaic module when mounted in a vertical position, the wind load tilts the photovoltaic module around the axis provided by the pair of hinges into a position with reduced drag force acting on the two vertical posts returning the at least one photovoltaic module, to the vertical position by gravitation force after the wind load drops.

2. The method of claim 1, further comprising making the two vertical posts of standard steel or aluminum profiles, sheet metal bending, or extrusion.

3. The method of claim 2, further comprising inserting the vertical posts supporting the at least one photovoltaic module into the ground to less than three-meter depth.

4. The method of claim 1, wherein the wind load acting against a weight of the at least one photovoltaic module forces the rotation of the at least one photovoltaic module.

5. The method of claim 4, wherein the rotation of the at least one photovoltaic module reduces the load on the vertical posts and hinges.

6. The method of claim 4, further comprising utilizing the weight of the at least one photovoltaic module to return the photovoltaic module to the vertical position.

7. A vertically mounted photovoltaic system, comprising:
at least one photovoltaic module and a photovoltaic module mount, including two vertical posts anchored to ground and configured to support the at least one photovoltaic module at both sides of the photovoltaic module; and
a pair of hinges with a hinge on each side of the at least one photovoltaic module connecting the at least one photovoltaic module to the vertical posts and a pivot coaxial with the hinges and located above the center of mass of the at least one PV photovoltaic module, with the pivot supporting a free rotation of the at least one photovoltaic module; and
wherein, when mounted in a vertical position, the at least one photovoltaic module rotates under a wind load and locates at a tilt angle that reduces the wind load on the pair of hinges and posts; and
wherein the at least one photovoltaic module is configured to return to the vertical position after the wind load drops.

8. The photovoltaic system of claim 7, wherein the at least one photovoltaic module is a bifacial photovoltaic module.

9. The photovoltaic system of claim 7, wherein the vertical posts supporting the at least one photovoltaic module are made from standard profiles.

10. The photovoltaic system of claim 7, wherein the vertical posts supporting the at least one photovoltaic module are configured to be inserted into the ground to a depth of less than 3.0 meter.

11. The photovoltaic system of claim 7, wherein with the increase of wind load the at least one photovoltaic module is configured to rotate to reduce the wind load on the posts and hinges.

12. The photovoltaic system of claim 11, wherein when the wind load is reduced, weight of the at least one photovoltaic module and center of mass located below pivot axis returns the photovoltaic module to the vertical position.

13. The photovoltaic system of claim 7, wherein the tilt angle that reduces the wind load on the hinges and posts is less than 90 degrees.

\* \* \* \* \*